United States Patent
Tsukagoshi et al.

(10) Patent No.: US 7,639,593 B2
(45) Date of Patent: Dec. 29, 2009

(54) MULTI-LAYER OPTICAL RECORDING MEDIUM AND METHOD FOR EVALUATING OPTICAL RECORDING SYSTEM

(75) Inventors: Takuya Tsukagoshi, Sagamihara (JP); Koji Mishima, Chuo-ku (JP); Daisuke Yoshitoku, Chuo-ku (JP)

(73) Assignee: TDK Corporation, Tokyo (JP)

( * ) Notice: Subject to any disclaimer, the term of this patent is extended or adjusted under 35 U.S.C. 154(b) by 651 days.

(21) Appl. No.: 11/251,986

(22) Filed: Oct. 18, 2005

(65) Prior Publication Data
US 2006/0092821 A1    May 4, 2006

(30) Foreign Application Priority Data
Oct. 28, 2004 (JP) ............... 2004-314290

(51) Int. Cl.
*G11B 7/24* (2006.01)
(52) U.S. Cl. .................................. 369/275.1
(58) Field of Classification Search ........... 369/283, 369/275.1, 275.2, 275.4, 275.3; 428/64.1; 430/321
See application file for complete search history.

(56) References Cited
U.S. PATENT DOCUMENTS

| | | | | |
|---|---|---|---|---|
| 5,481,530 A * | 1/1996 | Ueda et al. | ............. | 369/275.1 |
| 5,559,784 A * | 9/1996 | Ota | ............. | 369/94 |
| 5,764,620 A | 6/1998 | Satoh et al. | | |
| 5,870,374 A | 2/1999 | Satoh et al. | | |
| 7,345,973 B2 * | 3/2008 | Martens et al. | ............ | 369/47.53 |
| 2002/0172113 A1 | 11/2002 | Hirokane et al. | | |
| 2003/0185121 A1 | 10/2003 | Narumi et al. | | |
| 2003/0185138 A1 | 10/2003 | Nakata | | |
| 2004/0085874 A1 | 5/2004 | Akiyama et al. | | |
| 2004/0139459 A1* | 7/2004 | Mishima et al. | ............ | 720/718 |
| 2005/0025014 A1 | 2/2005 | Watabe | | |

FOREIGN PATENT DOCUMENTS

| | | |
|---|---|---|
| EP | 1 258 868 A2 | 11/2002 |
| EP | 1 318 509 A1 | 6/2003 |
| EP | 1 607 942 A1 | 12/2005 |
| JP | A-2001-155380 | 6/2001 |
| JP | A-2004-213720 | 7/2004 |

(Continued)

OTHER PUBLICATIONS

IRIX Admin: Disks and Filesystems, Aug. 6, 2005, pp. 2-3.*

(Continued)

*Primary Examiner*—Tan X Dinh
(74) *Attorney, Agent, or Firm*—Oliff & Berridge, PLC

(57) ABSTRACT

A multi-layer optical recording medium in which an effect of an interlayer crosstalk can be accurately measured and a method for evaluating a recording system using the same are provided. The multi-layer optical recording medium has a signal intensity measuring region formed in advance such that each recording layer having an identical address is allowed to have a different reflectivity. A signal intensity variation occurring when data recorded on the signal intensity measuring region is reproduced is measured to obtain signal intensity variation information. The method calculates a coherence parameter m describing the coherence of a recording system from the signal intensity variation information and reflectivity information obtained at each of the recording layers without interference from the other recording layers.

5 Claims, 6 Drawing Sheets

FOREIGN PATENT DOCUMENTS

| | | |
|---|---|---|
| WO | WO 97/23870 | 7/1997 |
| WO | WO 2004/086372 A1 | 3/2004 |
| WO | WO 2004/036559 A1 | 4/2004 |
| WO | WO 2004/086372 A1 | 10/2004 |
| WO | WO 2004/114289 A1 | 12/2004 |
| WO | WO 2005/104115 A1 | 11/2005 |

OTHER PUBLICATIONS

ODC Nimbus, Addressing Schemes for Optical Discs, 2004.*

Kenichi Nishiuchi et al., "Limitations for the Number of Layers of Multi-Layer Rewritable Phase-Change Optical Disks," vol. 32 No. 1 pp. 33-37 (2004) (w/ abstract).

Hideki Kitaura et al., "Multi-layer Write-once Media with Te-O-Pd Films Utilizing a Violet Laser," Proceedings of SPIE vol. 4342 pp. 340-347 (2002) (w/ abstract).

* cited by examiner

MULTI-LAYER OPTICAL RECORDING MEDIUM AND METHOD FOR EVALUATING OPTICAL RECORDING SYSTEM

BACKGROUND OF THE INVENTION

1. Field of the Invention

The present invention relates to a multi-layer optical recording medium and a method for evaluating a recording system including the same.

2. Description of the Related Art

Widely used optical recording media for recording digital data include compact discs (CDs), digital versatile discs (DVDs), and Blu-ray discs (BDs). To increase the recording capacity of these optical recording media, a multi-layer optical recording medium having a multi-layer structure in which a plurality of recording layers are stacked has been proposed.

As this multi-layer structure, a double layer structure has already been put into practical use, and further four to eight layer structures are now under study (described in Kenichi Nishiuchi et al., The Review of Laser Engineering, vol. 32, No. 1, pp 33-37 (2004)). In either case, a structure is employed in which recording layers are stacked with a transparent spacer layer (referred to below as a spacer layer) interposed between each layer and the next layer.

In such multi-layer optical recording media, when reproducing information in a certain recording layer, reflections from other recording layers inevitably occur (interlayer crosstalk). If the amounts of the reflections or a distance between recording layers vary due to some reason, there is a problem that the variation (referred to below as a crosstalk variation) is overlapped with a reproduced signal as a noise.

To reduce an effect of such interlayer crosstalk, as described in, for example, Japanese Patent Laid-Open Publication No. 2004-213720, a multi-layer optical recording medium is proposed in which the distances between recording layers are made different from each other. Another method, although not publicly known, has also been proposed in which the size and shape of the light receiving surface of a photo sensor are optimized and a reproduced signal is passed through a high-frequency filter, whereby a noise caused by the variation of a crosstalk is reduced.

Among various effects of the interlayer crosstalk in a multi-layer optical recording medium, a critical problem is the occurrence of a signal intensity variation.

Although in general optical recording media the variation of the reflectivity of a laser beam focused on a recording layer is detected as a signal, the variation of the reflectivity or signal intensity (signal intensity variation) is inevitably present even if data has not yet been recorded. The signal intensity variation is caused by, for example, the shape errors of grooves and pits provided on an optical recording medium, the variation of the thickness of a thin film forming a recording layer, or the unevenness of a surface or an interface.

The study by the inventors has found that the above signal intensity variation, which becomes pronounced in multi-layer optical recording media, is significantly increased not only simply by an increase in the number of recording layers, but also by a specific component of the crosstalk light beams (referred to below as a confocal crosstalk light beam) which is nearly focused on a photo sensor together with a signal light beam (this finding is not publicly known).

Accordingly, it becomes necessary to evaluate multi-layer optical recording media in consideration of such a signal intensity variation.

A conventional method of evaluating an optical recording medium is that the signal intensity variations are measured over the optical recording medium from inner to outer circumferences to quantify each circumference by using a degree of modulation as an indicator.

According to this method, when reproducing a certain region on an optical recording medium, the maximum and minimum values of signal intensity are measured to calculate the value of a degree of modulation given by the equation (maximum value−minimum value)/(maximum value); if this degree of modulation is, for example, 15 percent or less, good recording and reproduction are regarded to be possible.

When reproducing a multi-layer optical recording medium especially having three or more recording layers, however, since both the signal light beam and confocal crosstalk light beam are highly coherent in time and space, they easily interfere with each other. Therefore, even if the optical path length difference between the two increases or decreases by an amount equal to about a wavelength, the amount of received light increases or decreases due to the interference. In theory, it is possible to control the increase and decrease of this optical path length difference by uniforming the thicknesses of the spacer layers between recording layers, but in practice, it is impossible to uniform the thicknesses of the spacer layers with an accuracy of less than the wavelength of a reproducing laser beam (250 to 420 nm when the refractive index is assumed to be 1.56).

The degree of modulation of such inevitable signal intensity variation is given by the following equation (1).

(equation 1)

$$\text{Mod} = \frac{4\sqrt{\alpha}}{1+\alpha+2\sqrt{\alpha}} \qquad (1)$$

In this equation, the symbol α denotes the received light intensity ratio of a crosstalk light beam with respect to a signal light beam, and the above degree of modulation occurs by an ideal interference.

This received light intensity ratio α is the light amount ratio between a crosstalk light beam and a signal light beam, wherein the amount of each light beam is determined by designs of the optical system and multi-layer optical recording medium and is obtained by actual measurements or from calculations by optical simulation. This received light intensity ratio α will be further described in detail below.

In the reproducing process of a multi-layer optical recording medium, a reproducing light beam is irradiated so as to focus on a recording layer (reproducing layer) to be reproduced. It is assumed here that: a light beam that is reflected only on the reproducing layer and emitted again to the outside of the multi-layer optical recording medium is referred to as a signal light beam; and light beams that are reflected on the recording layers other than the reproducing layer and a light beam that experiences multiple reflections of three times or more are referred to together as crosstalk light beams. The optical system is designed so that the signal light beam focuses again on a photo sensor after having passed through an objective lens. This implies that the reproducing layer and the photo sensor are designed so as to correspond to the object surface and the image surface of the objective lens, respectively. Since the light receiving area of the photo sensor is designed so as to be larger than the diffraction-limited beam diameter in the return path of the signal light beam, the signal light beam irradiated to the photo sensor is mostly detected on the light receiving surface. In the meantime, the crosstalk light beams take various light paths and are irradiated to the photo sensor, among which the amounts depending on their light paths are detected on the light receiving surface (the larger the amount of light not focusing on the light receiving surface, the smaller the amount of light detected). Therefore, by paying attention to the crosstalk light beam having the maximum amount of light detected on the light receiving surface, the received light intensity ratio of the amount of light detected on this light receiving surface with respect to a signal light beam is denoted by $\alpha$.

Even if a received light intensity ratio of 1% is assumed, the degree of modulation Mod obtained from the equation (1) reaches as much as 33%. Although the signal intensity variation is actually reduced, for example, by effects of the aberrations occurring in an optical system or an optical recording medium, the degree of modulation is likely to become approximately 20 to 50% of the value given by the equation (1).

Although a method of reducing the interlayer crosstalk has been proposed in the patent document as described above, a method of accurately measuring an effect of the interlayer crosstalk has not been proposed.

Accordingly, there has been neither a method for evaluating a multi-layer optical recording medium nor a method for evaluating a performance of the system to reduce the signal intensity variation in a recording system including a multi-layer optical recording medium.

SUMMARY OF THE INVENTION

In view of the foregoing problems, various exemplary embodiments of this invention provide a multi-layer optical recording medium wherein the signal intensity variation can be accurately measured and a method for evaluating a performance of a recording system including the multi-layer optical recording medium by measuring the signal intensity variation.

The present inventors, as a result of diligent study, have found out a method that can obtain a coherence parameter by measuring the signal intensity variation in a multi-layer optical recording medium.

In summary, the above-described objectives are achieved by the following aspects of the present invention.

(1) A multi-layer optical recording medium having at least three recording layers stacked with a transparent spacer layer interposed between each layer and the next layer, the multi-layer optical recording medium comprising: a signal intensity measuring region comprising a plurality of areas, formed such that a reflectivity of each of the recording layers in the area having an identical address is allowed to have a plurality of different levels, wherein, in the signal intensity measuring region, different combinations of the recording layers and the reflectivities are assigned to the areas having different addresses.

(2) The multi-layer optical recording medium according to (1), wherein if the number of the recording layers is denoted by N and the number of levels of the reflectivity of each recording layer is denoted by M, the signal intensity measuring region includes $M^N$ areas.

(3) The multi-layer optical recording medium according to (1) or (2), wherein: the recording layers in the signal intensity measuring region are formed flat; and a reflection condition of each of the recording layers in an identical area in the signal intensity measuring region is changed by at least the depth of a groove on the recording layer among the depth, width, and pitch of the groove.

(4) The multi-layer optical recording medium according to any one of (1) to (3), further comprising a reflectivity measuring region that enables a light beam to illuminate and its reflection to exit at least one recording layer among the plurality of recording layers excluding the recording layer on the nearest side to incident light, through the transparent spacer layer and without passing through the other recording layers.

(5) The multi-layer optical recording medium according to (4), wherein in the reflectivity measuring region, positions of inner circumference ends of the recording layers facing an inner hole are sequentially offset so that the recording layer closer to a light incident surface is more remote from the inner hole.

(6) The multi-layer optical recording medium according to (4) or (5), wherein in the reflectivity measuring region, positions of outer circumference ends of the recording layers are sequentially offset so that the recording layer closer to the light incident surface is more inside.

(7) The multi-layer optical recording medium according to any one of (4) to (6), wherein the recording layers in the reflectivity measuring region are formed flat.

(8) A method for evaluating a recording system using a multi-layer optical recording medium having at least three recording layers stacked with a transparent spacer layer interposed between each layer the next layer, the method comprising: directly or indirectly measuring either time or space coherence between two or more reflected light beams having at least a different part of an optical path among the reflected light beams of a light beam incident on the multi-layer optical recording medium.

(9) The method for evaluating a recording system according to (8), further comprising: calculating a coherence parameter describing coherence of the recording system from reflectivity information obtained at each of the recording layers without through the other recording layers and signal intensity variation information measured at each of the recording layers.

(10) The method for evaluating a recording system according to (9), wherein: a signal intensity measuring region is provided in advance in the multi-layer optical recording medium such that each of the recording layers having an identical address is allowed to have a different reflectivity; and a signal intensity variation occurring during reproduction of data recorded on the signal intensity measuring region is measured to obtain the signal intensity variation information.

(11) The method for evaluating a recording system according to (9) or (10), wherein on the basis of an ideal coherence state in which a signal light beam and a crosstalk light beam, generated when a reproducing light beam is irradiated on the multi-layer optical recording medium, each have an identical intensity distribution and an identical wavefront shape on the light receiving surface of a light receiving element, a recording system including a multi-layer optical recording medium is evaluated from the signal intensity variation information.

(12) The method for evaluating a recording system according to any one of (9) to (11), wherein: the light receiving element detects received light amounts of the signal light beam and multiple crosstalk light beams; and a value m denoting the coherence parameter is determined in such a way that a value of a degree of modulation Mod of the signal intensity variation, given by $Mod=(I_{max}-I_{MIN})/I_{MAX}=4m\sqrt{\alpha}/(1+\alpha+2m\sqrt{\alpha})$, and an actually measured value of the signal intensity variation information become equal to each other where a received light intensity ratio between the signal light beam and the crosstalk light beam is denoted by α and maximum and minimum values of the received light amount are denoted by $I_{MAX}$ and $I_{MIN}$, respectively.

In the multi-layer optical recording medium according to the invention, the signal intensity variation can be measured accurately and universally. Further, it is possible to evaluate a performance of a recording system including this multi-layer optical recording medium by measuring the signal intensity variation using this multi-layer optical recording medium.

DETAILED DESCRIPTION OF THE INVENTION

The multi-layer optical recording medium and the recording system using the same according to an exemplary embodiment of the invention will now be described in detail with reference to the accompanying drawings.

Figure 1:
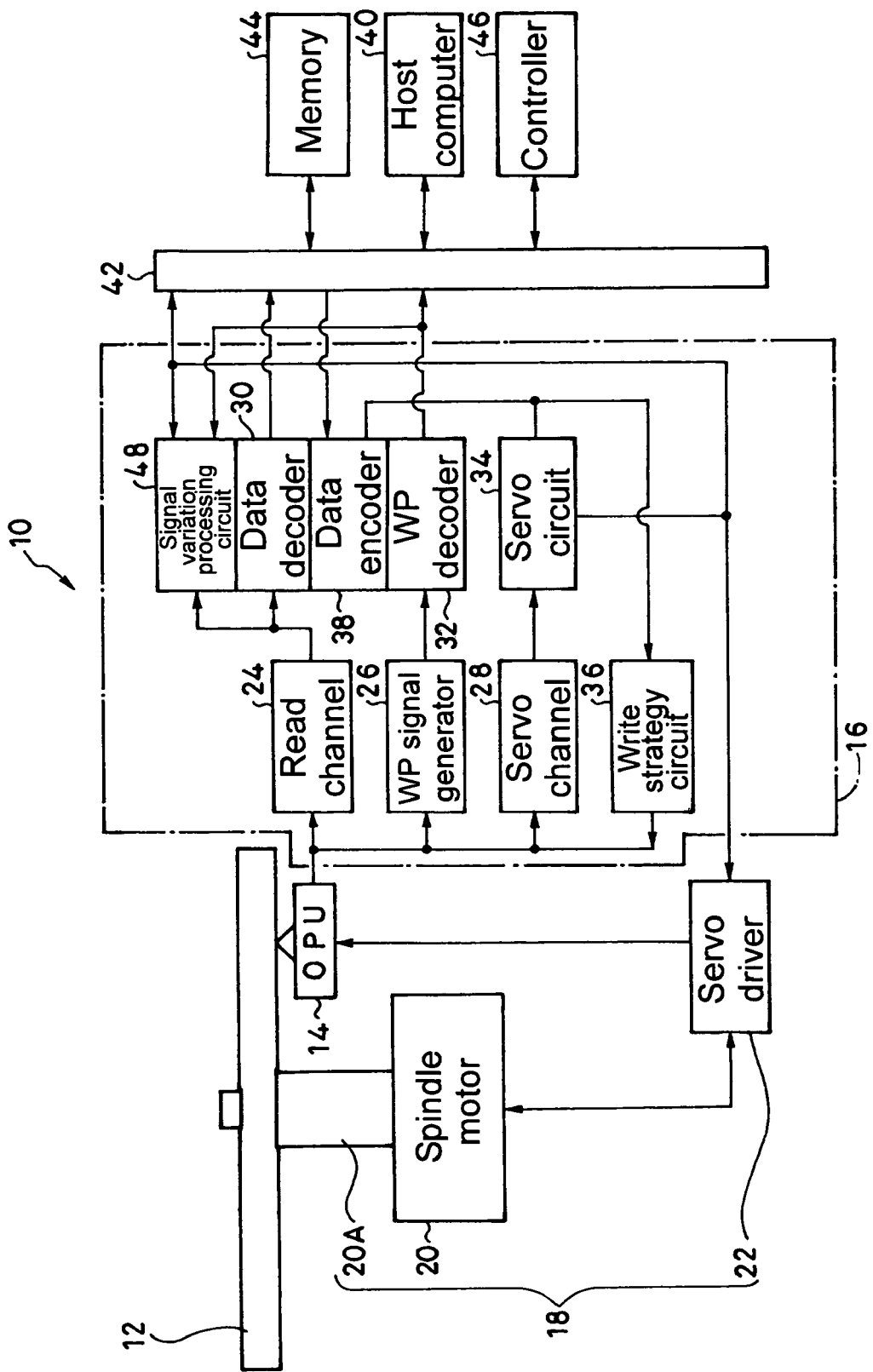
FIG. 1 is a block diagram showing a recording system according to one exemplary embodiment of the invention.

Referring to FIG. 1, a recording system 10 comprises a multi-layer optical recording medium 12, an optical pickup (referred to below as OPU) 14, a signal processor 16, and a driving mechanism 18. The OPU 14 records or reproduces information on or from the multi-layer optical recording medium 12. The signal processor 16 performs signal input and output operations through the OPU 14 and a coherence measurement. The driving mechanism 18 drives the multi-layer optical recording medium 12 to rotate according to a signal received from the signal processor 16.

The OPU 14 incorporates a semiconductor laser as a light source and a laser driver (both not shown), wherein the emission power and timing of the semiconductor laser are controlled by the laser driver receiving a signal from the signal processor 16.

The driving mechanism 18 for driving the multi-layer optical recording medium 12 has: a spindle motor 20 that drives the multi-layer optical recording medium 12 to rotate through a spindle 20A; and a servo driver 22 that drives the spindle motor 20 according to a signal received from the signal processor 16.

In the OPU 14, an optical system and a photo sensor (both not shown) are provided.

The signal processor 16 comprises a read channel 24, a wobble and prepit (WP) signal generator 26, and a servo channel 28 receiving a read channel signal, wobble and prepit (WP) signals, and a servo channel signal, respectively, from the photo sensor in the OPU 14.

The read channel 24 is mainly used for generating a data signal. Its detected signal passes through a frequency filter (not shown), and is output as a data signal after decoding and error correcting operations are performed by a data decoder 30.

The WP signal generator 26 generates WP signals and outputs them through a WP decoder 32. The WP signals are generated by reproducing the wobbles and prepits formed in advance on a multi-layer optical recording medium and indicates a channel clock and address information.

The servo channel 28 is used for detecting focus and tracking errors, and the detected signals are output through a servo circuit 34 to a write strategy circuit 36 and the servo driver 22. That is, the servo circuit 34 performs a feedback control.

The write strategy circuit 36 and a data encoder 38 are necessary for recording data on the multi-layer optical recording medium 12. The data encoder 38 encodes recording data sent from a host computer 40, and the write strategy circuit 36 controls the emission timing of the laser beam emitted from the OPU 14 with reference to the channel clock and address information, thereby performing recording.

The signal processor 16 including the above circuits communicates with the host computer 40, a memory 44, and a controller 46 via a common interface 42, whereby each function is achieved.

The signal processor 16 also includes a signal variation processing circuit 48 for calculating a coherence parameter m (described later).

Next, the configuration of the multi-layer optical recording medium 12 will be described in detail.

Figure 2:
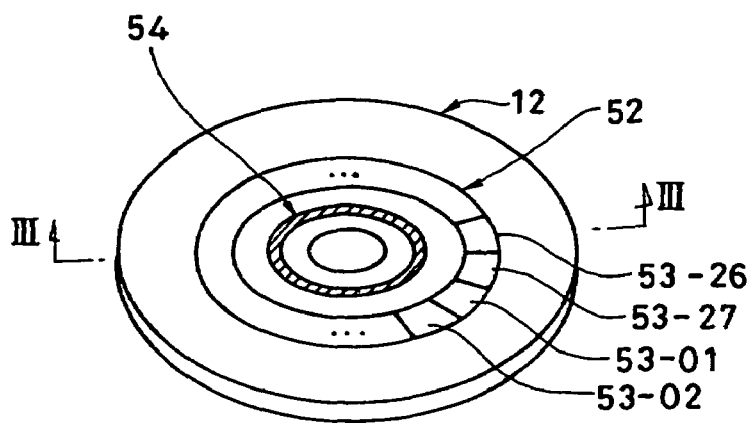
FIG. 2 is a perspective view showing a multi-layer optical recording medium according to one exemplary embodiment of the invention.
Figure 3:
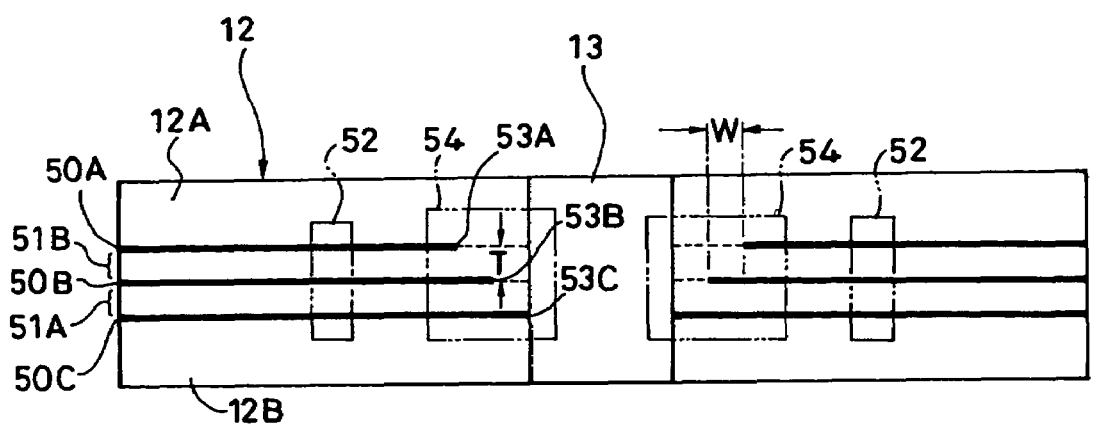
FIG. 3 is an enlarged cross sectional view schematically showing a section taken along the line III-III of FIG. 2.

As shown in FIG. 2 and FIG. 3, the multi-layer optical recording medium 12 comprises a substrate 12B, three recording layers formed thereon, and a cover layer 12A. Here, the three recording layers include an L3 layer 50C, an L2 layer 50B, and an L1 layer 50A, which are stacked with first and second spacers 51A and 51B in between each layer and the next layer.

In the multi-layer optical recording medium 12, a signal intensity measuring region 52 and a reflectivity measuring region 54 are separately provided.

The signal intensity measuring region 52 is formed in a ring shape within the recording region, and is divided into 27 areas 53-01 to 53-27 in the circumference direction. As shown in table 1, the reflection conditions of these areas 53-01 to 53-27 are made different from each other in such a way that: if the number of levels of reflection condition of each recording layer is denoted by M and the number of recording layers by N, there are $M^N$ combinations of reflection conditions in total, and when there are three different recording layers, i.e., N=3, and M is set to the value equal to N=3, the number of the reflection conditions results in $M^N=3^3=27$ combinations, which are assigned to the areas 53-01 to 53-27.

TABLE 1

| Area | Reflection condition L1 | L2 | L3 | Zero-order Diffraction efficiency D1 | D2 | D3 | Received light intensity ratio α1 | β1 | α2 | β2 | α3 | β3 | Signal intensity variation Mod 1 | Mod 2 | Mod 3 |
|---|---|---|---|---|---|---|---|---|---|---|---|---|---|---|---|
| 1  | A | A | A | D1A | D2A | D3A | α 101 | β 101 | α 201 | β 201 | α 301 | β 301 | M101 | M201 | M301 |
| 2  | A | A | B | D1A | D2A | D3B | α 102 | β 102 | α 202 | β 202 | α 302 | β 302 | M101 | M201 | M301 |
| 3  | A | A | C | D1A | D2A | D3C | α 103 | β 103 | α 203 | β 203 | α 303 | β 303 | M101 | M201 | M301 |
| 4  | A | B | A | D1A | D2B | D3A | α 104 | β 104 | α 204 | β 204 | α 304 | β 304 | M101 | M201 | M301 |
| 5  | A | B | B | D1A | D2B | D3B | α 105 | β 105 | α 205 | β 205 | α 305 | β 305 | M101 | M201 | M301 |
| 6  | A | B | C | D1A | D2B | D3C | α 106 | β 106 | α 206 | β 206 | α 306 | β 306 | M101 | M201 | M301 |
| 7  | A | C | A | D1A | D2C | D3A | α 107 | β 107 | α 207 | β 207 | α 307 | β 307 | M101 | M201 | M301 |
| 8  | A | C | B | D1A | D2C | D3B | α 108 | β 108 | α 208 | β 208 | α 308 | β 308 | M101 | M201 | M301 |
| 9  | A | C | C | D1A | D2C | D3C | α 109 | β 109 | α 209 | β 209 | α 309 | β 309 | M101 | M201 | M301 |
| 10 | B | A | A | D1B | D2A | D3A | α 110 | β 110 | α 210 | β 210 | α 310 | β 310 | M101 | M201 | M301 |
| 11 | B | A | B | D1B | D2A | D3B | α 111 | β 111 | α 211 | β 211 | α 311 | β 311 | M101 | M201 | M301 |
| 12 | B | A | C | D1B | D2A | D3C | α 112 | β 112 | α 212 | β 212 | α 312 | β 312 | M101 | M201 | M301 |
| 13 | B | B | A | D1B | D2B | D3A | α 113 | β 113 | α 213 | β 213 | α 313 | β 313 | M101 | M201 | M301 |
| 14 | B | B | B | D1B | D2B | D3B | α 114 | β 114 | α 214 | β 214 | α 314 | β 314 | M101 | M201 | M301 |
| 15 | B | B | C | D1B | D2B | D3C | α 115 | β 115 | α 215 | β 215 | α 315 | β 315 | M101 | M201 | M301 |
| 16 | B | C | A | D1B | D2C | D3A | α 116 | β 116 | α 216 | β 216 | α 316 | β 316 | M101 | M201 | M301 |
| 17 | B | C | B | D1B | D2C | D3B | α 117 | β 117 | α 217 | β 217 | α 317 | β 317 | M101 | M201 | M301 |
| 18 | B | C | C | D1B | D2C | D3C | α 118 | β 118 | α 218 | β 218 | α 318 | β 318 | M101 | M201 | M301 |
| 19 | C | A | A | D1C | D2A | D3A | α 119 | β 119 | α 219 | β 219 | α 319 | β 319 | M101 | M201 | M301 |
| 20 | C | A | B | D1C | D2A | D3B | α 120 | β 120 | α 220 | β 220 | α 320 | β 320 | M101 | M201 | M301 |
| 21 | C | A | C | D1C | D2A | D3C | α 121 | β 121 | α 221 | β 221 | α 321 | β 321 | M101 | M201 | M301 |
| 22 | C | B | A | D1C | D2B | D3A | α 122 | β 122 | α 222 | β 222 | α 322 | β 322 | M101 | M201 | M301 |
| 23 | C | B | B | D1C | D2B | D3B | α 123 | β 123 | α 223 | β 223 | α 323 | β 323 | M101 | M201 | M301 |
| 24 | C | B | C | D1C | D2B | D3C | α 124 | β 124 | α 224 | β 224 | α 324 | β 324 | M101 | M201 | M301 |
| 25 | C | C | A | D1C | D2C | D3A | α 125 | β 125 | α 225 | β 225 | α 325 | β 325 | M101 | M201 | M301 |
| 26 | C | C | B | D1C | D2C | D3B | α 126 | β 126 | α 226 | β 226 | α 326 | β 326 | M101 | M201 | M301 |
| 27 | C | C | C | D1C | D2C | D3C | α 127 | β 127 | α 227 | β 227 | α 327 | β 327 | M101 | M201 | M301 |

Figure 4:
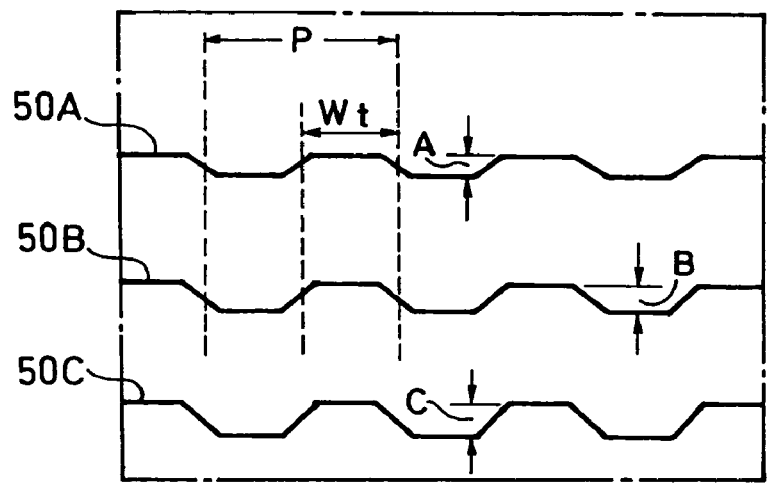
FIG. 4 is a cross-sectional view schematically showing a relationship between the recording layers and the reflection conditions in a signal intensity measuring region of the multi-layer optical recording medium in FIG. 2.

As shown in FIG. 4, for example, the reflection conditions are created such that if each recording layer has an identical groove pitch P and width $W_r$, the groove depths A, B, and C are formed so as to satisfy the inequality of A<B<C, whereby making the zero-order diffraction efficiencies of the reproducing light beams have a relationship of a>b>c.

Figure 5:
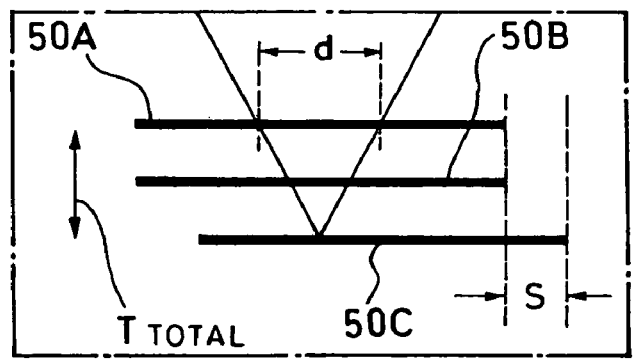
FIG. 5 is a cross-sectional view schematically showing a relationship among the width, amount of eccentricity, and beam spot diameter in the signal intensity measuring region of the multi-layer optical recording medium in FIG. 2.

The signal intensity measuring region 52 may be provided at any locations in the multi-layer optical recording medium 12, and may be formed not only in a single region as shown in FIG. 2 but also in a plurality of regions. However, when the maximum amount of eccentricity among the L1 layer 50A, the L2 layer 50B, and the L3 layer 50C forming the multi-layer optical recording medium 12 is denoted by S as shown in FIG. 5 and the maximum reproducing beam spot diameter (spot diameter on the L1 layer when reproducing the L3 layer) by d, it is preferable for a single signal intensity measuring region to have a width of d+2S or more in the radius direction of the multi-layer optical recording medium 12.

In the reflectivity measuring region 54, as shown in FIG. 3, the L1 layer 50A, the L2 layer 50B, and the L3 layer 50C, each facing an inner hole 13, are formed such that the positions of their inner circumference ends 53A, 53B, and 53C thereof are sequentially offset by a width W so that the L1 layer 50A nearest to the light incident surface (cover layer 12A side) is most remote from the inner hole 13.

If the distance between the L1 layer, the L2 layer, and the L3 layer is denoted by T, the numerical aperture of the objective lens in the reproducing optical system in the OPU 14 by NA, and the refractive index of the cover layer 12A and first and second spacers 51A and 51B by n, the position difference W between the inner circumference ends 53A to 53C of the L1 layer 50A to the L3 layer 50C about the inner hole 13 is needed to satisfy a relationship $W > T \tan\{\sin^{-1}(NA/n)\}$. The above position difference W (width) between the inner circumference ends 53A to 53C of the L1 layer to the L3 layer is formed as follows.

Grooves (pits) formed on a stamper are transferred and printed onto the substrate 12B of the multi-layer optical recording medium 12 when the substrate 12B is molded or onto the spacers 51A and 51B comprising a radiation curable resin when they are cured, by pushing the stamper on each of them. The L1 layer 50A to the L3 layer 50C are formed by, for example, a magnetron sputtering method. During the formation of each of these layers, the film is not formed on the periphery of the inner hole 13 and the outer periphery because they are covered with a jig for fixing a disc. Accordingly, by using a different jig for each recording layer, the recording layers are easily formed so that their inner circumference ends are positioned differently as shown in FIG. 3. A reflectivity measuring region can also be formed in the same way on the outer periphery side of the multi-layer optical recording medium 12.

The L1 layer 50A, the L2 layer 50B, and the L3 layer 50C of the multi-layer optical recording medium 12 are thus formed and their end regions on the inner hole 13 side, having the width W, are reproduced, whereby the reflectivities of the L1 layer 50A to the L3 layer 50C can be accurately measured. To perform more accurate reflectivity measurements, a flat structure is preferable in which there are no grooves or pits in the range of the width W in the vicinity of the inner hole 13 (or outer peripheral vicinity) of the L1 layer 50A to the L3 layer 50C.

Next, a process will be described in which the above recording system 10 obtains the signal intensity variation information when the multi-layer optical recording medium 12 is reproduced and calculates an interference parameter m which becomes an evaluation criterion for the multi-layer optical recording medium 12 and the recording system 10 including the same.

Figure 7:
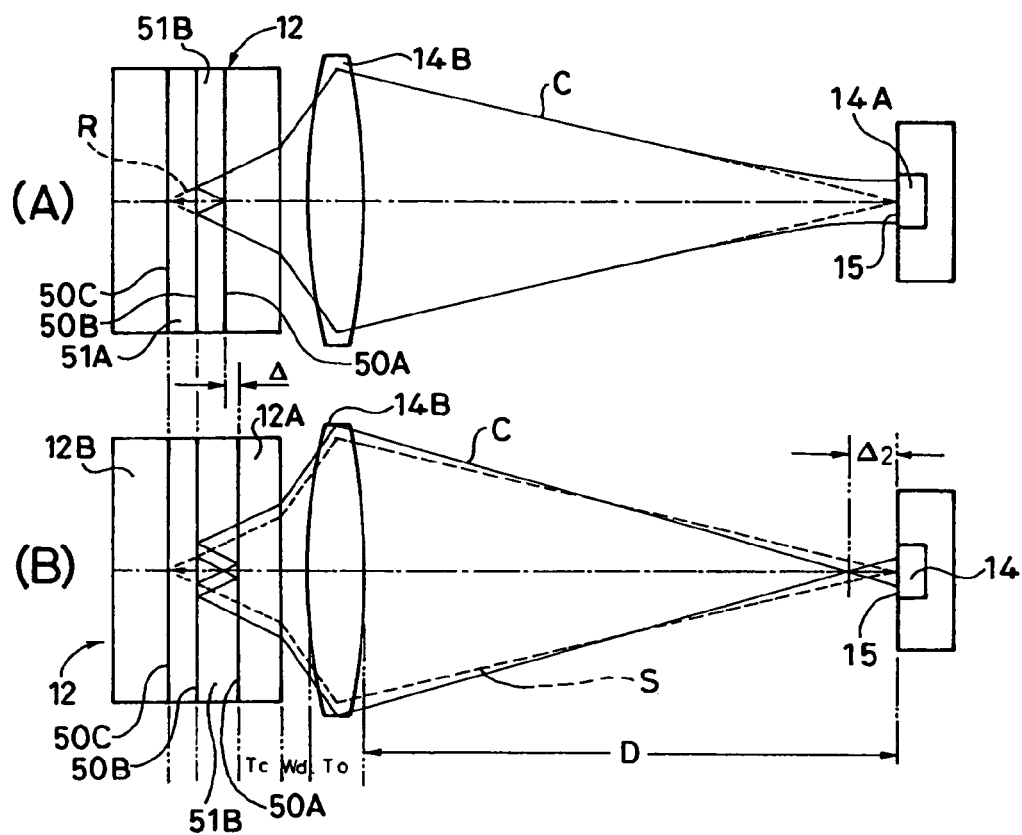
FIG. 7A is a cross-sectional view schematically showing a relationship between a confocal crosstalk light beam and a signal light beam.
FIG. 7B is a cross-sectional view schematically showing a relationship between the crosstalk light beam and the signal light beam when the thickness of a spacer layer is changed.
Figure 8:
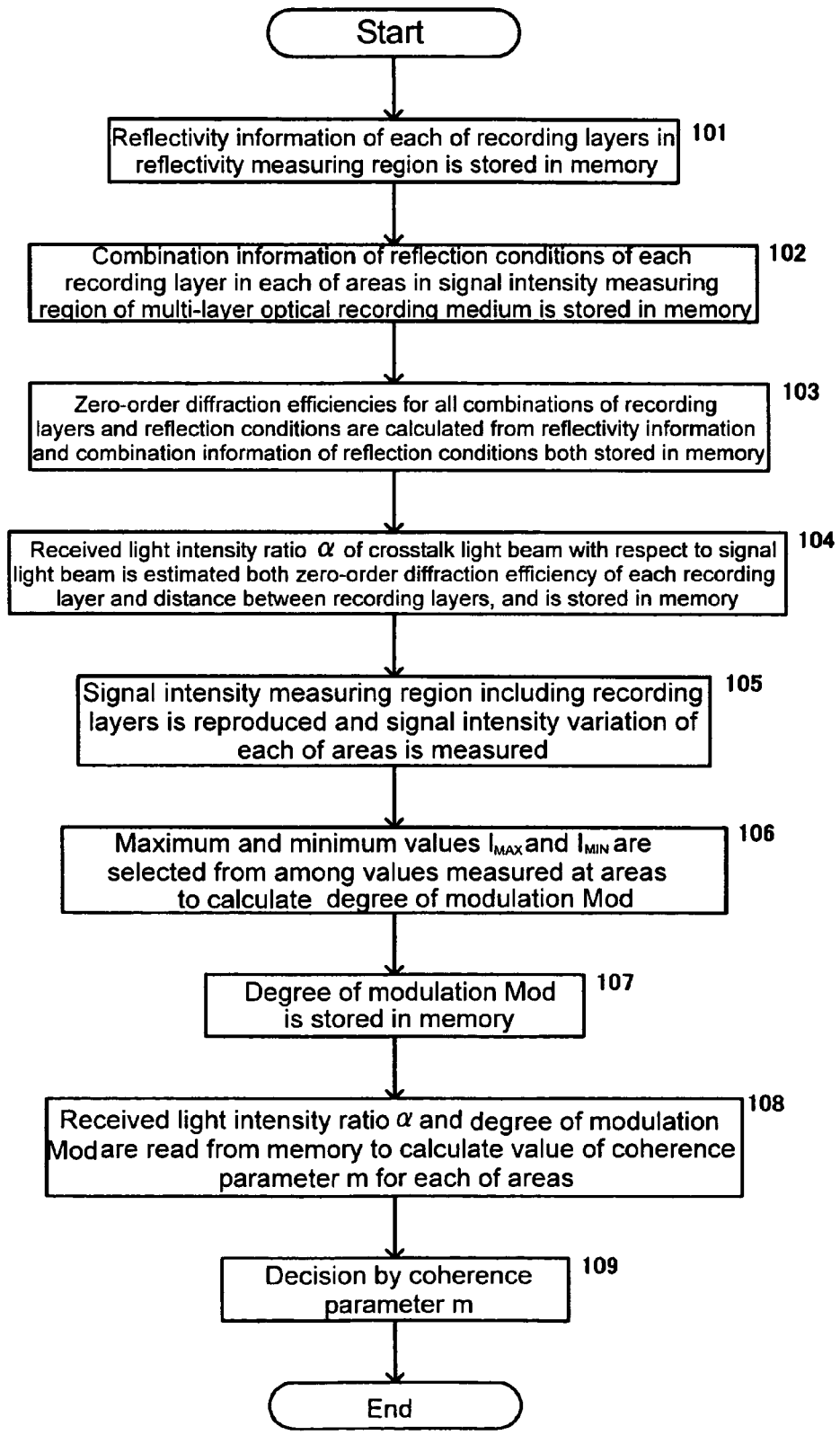
FIG. 8 is a flowchart showing a process for calculating a coherence parameter m by using the recording system according to one exemplary embodiment of the invention.

First, a relationship between a crosstalk light beam, which causes the signal intensity variation to be measured in the present invention, and a signal light beam will be described with reference to FIGS. 6 to 8. In these drawings, the reference characters 14A, 15, and 14B indicate a photo sensor in the OPU 14, the light receiving surface of the photo sensor 14A, and an objective lens provided in the optical system in the OPU 14, respectively.

Figure 6:
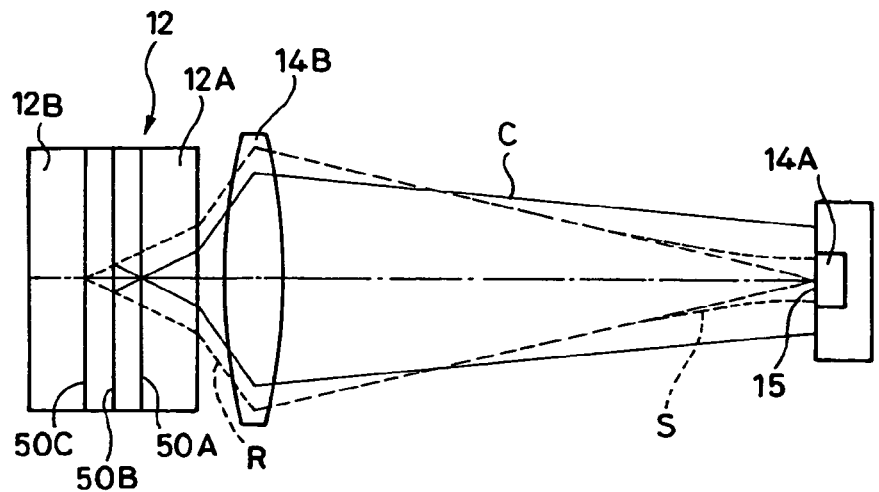
FIG. 6 is a cross-sectional view schematically showing a relationship between the crosstalk light beam and the signal light beam.

In FIG. 6, the optical path of a crosstalk light beam C, which is reflected once on a recording layer other than the recording layer to be reproduced, is indicated by a solid line, and a reproducing light beam R, which is incident on the multi-layer optical recording medium 12 from a light source (not shown) through the objective lens 14B, is indicated by a broken line.

Since the reproducing light beam R is incident to be focused on the L3 layer 50C, a component of the reproducing light beam, which has been reflected on the L2 layer 50B, is collected in the vicinity of the L1 layer 50A after the reflection and then exits the multi-layer optical recording medium 12 as a diverging light beam. Generally, the convex lens has a property that the closer an object is placed to the lens, the farther its image is formed at a location from the lens. Therefore, the crosstalk light beam C on the photo sensor 14A side is focused at a position more backward than that of a signal light beam S. That is, the crosstalk light beam C spreads over the photo sensor 14A, so that the amount of the light detected by the photo sensor 14A becomes small in comparison with that of the signal light beam.

FIG. 7A shows the reproducing light beam R (broken line), which is incident to be focused on the L3 layer 50C, and the crosstalk light beam C (solid line), which is sequentially reflected on the L2 layer 50B, the L1 layer 50A, and the L2 layer 50B in this order so that it follows exactly the same optical path as the reproducing light beam has taken when it has been incident, and focuses on the photo sensor 14A. Such a crosstalk light beam that cannot be geometrically distinguished from a signal light beam is referred to here as a "confocal crosstalk light beam."

FIG. 7B shows an optical path change of the crosstalk light beam, caused by increasing the thickness of the spacer layer 51B by a quantity Δ from the thickness in FIG. 7A. If the thickness of the spacer layer 51B between the L1 layer 50A and the L2 layer 50B is increased, the confocal crosstalk light beam shown in FIG. 7A changes to a non-confocal crosstalk light beam which, on the photo sensor 14A side, is focused at a position different from the position at which the signal light beam is focused.

The intensities of the signal light beam and the crosstalk light beam both detected by the photo sensor 14A are denoted by $I_S$ and $I_C$, respectively. It is assumed here that the signal light beam and the crosstalk light beam each have a uniform intensity and an identical wavefront on the light receiving surface 15, as a case in which they ideally interfere with each other. If the complex amplitude distributions of the signal light beam and the crosstalk light beam are denoted by As(r, t) and Ac(r, t), respectively, these are described by the following equations (2) and (3), where symbols t and r indicate time and a position on the light receiving surface, respectively.

(Equation 2)

$$A_S(r,t) = A_{S0} \exp\{i(\omega t - k \cdot r)\} \quad (2)$$

(Equation 3)

$$A_C(r,t) = A_{C0} \exp\{i(\omega t - k \cdot r + \phi)\} \quad (3)$$

In the above equations, $A_{S0}$ is given by $A_{S0} = \sqrt{I_S}/\sqrt{A}$, $A_{C0}$ is given by $A_{C0} = \sqrt{I_C}/\sqrt{A}$, the quantity $\omega = 2\pi C/\lambda$ denotes the angular frequency of the reproducing light beam, and the symbol k denotes the wavenumber vector of the reproducing light beam. The quantity $\phi = 2\pi \Delta L/\lambda$ (where, $\Delta L$ denotes the optical path length difference between the signal light beam and the crosstalk light beam) indicates the phase difference caused by the optical path length difference. Accordingly, if the optical path length difference between the signal light beam and the crosstalk light beam increases or decreases only by an amount equal to about half of the wavelength, the variation of the amount of light due to the interference occurs. The amount of light actually detected by the photo sensor is given by the following equation (4).

(equation 4)

$$I_{TOTAL} = \frac{1}{T}\int_0^T dt \int_A dr \left| A_S(r,t) + A_C(r,t) \right|^2 = I_S + I_C + 2m\sqrt{I_S I_C}\cos\phi \quad (4)$$

In the equation (4), the symbol A indicates the surface integral on the light receiving surface 15, in which a coherence parameter m is introduced. An ideal interference condition meets m=1, but an actual optical system experiences a reduction in coherence due to a spectrum line width, an aberration, an intensity distribution, and the like, resulting in 0<m<1.

As shown in FIG. 7B, if the thickness of the cover layer 12A is denoted by Tc, the distance between the front surface of the multi-layer optical recording medium 12 and the objective lens 14B by Wd, the thickness of the objective lens by $T_0$, the distance between the objective lens 14B and the photo sensor 14A by D, the refractive index of the cover layer 12A and the first and second spacer layers 51A and 51B by n, and the refractive index of the objective lens by $n_0$, the total optical path lengths along which the signal light beam and the crosstalk light beam travel after being incident on the multi-layer optical recording medium 12 until reaching the photo sensor 14A are given by the following equations (5) and (6).

(Equation 5)

$$L_S = 2n(T_C + 2s + \Delta) + Wd + n_0 T_0 + D \quad (5)$$

(Equation 6)

$$L_C = 2n\{T_C + 2(s+\Delta)\} + Wd + n_0 T_0 + D \quad (6)$$

Therefore, the optical path length difference between the signal light beam and the crosstalk light beam is given by the following equation (7).

(Equation 7)

$$\Delta L \equiv |L_S - L_C| = 2n\Delta \quad (7)$$

Assuming n=1.56 and λ=400 nm, when $\Delta \geq 128$ nm, the maximum and minimum values of the value $I_{total}$ are given by the following equations (8) and (9), respectively. Accordingly, the degree of modulation of the signal intensity variation is estimated from these maximum and minimum values by using the equation (10) below.

(Equation 8)

$$I_{MAX} = I_S + I_C + 2m\sqrt{I_S I_C} \cos \phi \quad (8)$$

(Equation 9)

$$I_{MIN} = I_S + I_C - 2m\sqrt{I_S I_C} \cos \phi \quad (9)$$

(equation 10)

$$\text{Mod} = \frac{I_{MAX} - I_{MIN}}{I_{MAX}} = \frac{4m\sqrt{\alpha}}{1 + \alpha + 2m\sqrt{\alpha}} \quad (10)$$

In the equation (10), the quantity $\alpha \equiv I_C/I_S$ becomes the intensity ratio of the crosstalk light beam with respect to the signal light beam. When n=1, the crosstalk light beam with an intensity ratio of only 1% ($\alpha$=0.01) causes the signal intensity variation with a degree of modulation of 33%, preventing a good signal reproduction.

For convenience of description, an ideal interference condition with a single crosstalk light beam has been assumed above. In a recording system using an actual multi-layer optical recording medium, however, multiple crosstalk light beams are present or the coherence decreases due to the above-described spectrum line width, aberration, intensity distribution, and the like.

To calculate the specific value of the coherence parameter m for a multi-layer optical recording medium and a recording system including the same, the signal intensity variation generated when the multi-layer optical recording medium is actually reproduced is measured and then fitting is performed on the equation (10) using the received light intensity ratio $\alpha$ between the signal light beam and the crosstalk light beam and the degree of modulation Mod of the signal intensity variation.

When the value m is calculated from the equation (10), only a single crosstalk light beam that is most dominant in the structure of the multi-layer optical recording medium 12 may be assumed. When two dominant crosstalk light beams are present, however, their received light intensity ratios with respect to a signal light beam are denoted by $\alpha$ and $\beta$ and the following equation (11) is used, as with the equations (5) to (10).

(equation 11)

$$\text{Mod} = \frac{m(g_{MAX} - g_{MIN})}{1 + \alpha + \beta + mg_{MAX}} \quad (11)$$

The phase differences between the two crosstalk light beams and the signal light beam are here denoted by $\phi_1$ and $\phi_2$, and are defined by the following equation (12) which is a function describing a signal intensity contrast caused by the interference.

(equation 12)

$$g(\phi_1, \phi_2) 2m\{\sqrt{\alpha}\cos\phi_1 + \sqrt{\beta}\cos\phi_2 + \sqrt{\alpha\beta}\cos(\phi_1 - \phi_2)\} \quad (12)$$

Further, when the above $\phi_1$ and $\phi_2$ can have arbitrary values, the maximum and minimum values of the function g are denoted by $g_{MAX}$ and $g_{MIN}$, respectively. Even when three or more dominant crosstalk light beams are present, the degree of modulation Mod of the signal intensity variation can be obtained by the exactly same calculation. The number of crosstalk light beams to be taken into account may thus be determined experientially according to a necessary evaluation accuracy. Alternatively, the reduction quantity of the coherence caused by multiple crosstalk light beams may be evaluated by making it be included in the value m from the start.

A process for obtaining the coherence parameter m from the above equations will be described with reference to the flowchart in FIG. 8.

In Step 101, the reflectivity information of each of the recording layers (the L1 layer 50A to the L3 layer 50C) in the reflectivity measuring region 54 of the multi-layer optical recording medium 12 is stored in the memory 54. The reflectivities in the reflectivity measuring region 54 may be measured in advance and stored in the memory, or may be actually measured as needed.

In Step 102, the combination information of the reflection conditions of each recording layer in each of the areas 53-01 to 53-27 in the signal intensity measuring region 52 of the multi-layer optical recording medium 12 is stored in the memory 44. This combination information is preset as shown in table 1.

In Step 103, the zero-order diffraction efficiencies for all combinations of the recording layers and reflection conditions ($M^N$=27 combinations) are calculated from the reflectivity information and combination information of the reflection conditions both stored in the memory 44.

Although the value of this zero-order diffraction efficiency intricately depends on the shape parameters of the grooves and pits and therefore cannot be described by an equation, the shapes of the grooves (pits) are predetermined and the corresponding diffraction efficiency is actually measured or calculated by optical simulation.

In Step 104, the received light intensity ratio $\alpha$ of the crosstalk light beam with respect to the signal light beam is estimated from both the zero-order diffraction efficiency of each recording layer and the distance between the recording layers, and is stored in the memory 44.

In Step 105, the signal intensity measuring region 52 in the multi-layer optical recording medium 12 is reproduced, and the signal intensity variation for each of the areas 53-01 to 53-27 is measured. At this time, a focus position of the laser beam is controlled by the servo driver 22 so as to focus on each of the L1 layer to the L3 layer and the signal intensity variation is measured.

In Step 106, the maximum and minimum values $I_{MAX}$ and $I_{MIN}$ are selected from among the values measured at the areas 53-01 to 53-27, and are substituted into the equation (10) to calculate the degree of modulation Mod, which is stored in the memory 44 in Step 107.

In Step 108, the stored received light intensity ratio $\alpha$ and the degree of modulation Mod are read from the memory 44 to calculate the value of the coherence parameter m for each of the areas 53-01 to 53-27.

In Step 109, the multi-layer optical recording medium 12 and the recording system 10 including the same are evaluated from the calculated coherence parameters m.

Actually, the multi-layer optical recording medium 12 and the recording system 10 including the same are adjusted so that the calculated interference parameters m are reduced as much as possible.

The above multi-layer optical recording medium 12 has been described as having three-recording layers, but the present invention is not limited to this number of layers. Four layers or more may be used. In this case, if the number of recording layers is denoted by N, ideally the number of areas in the signal intensity measuring region 52 is set so as to meet M=N, which results in $N^N$ combinations. According to the required measurement accuracy and cost, however, some of the combinations may be skipped.

Table 1 shows the signal intensity variation information and other information stored in the memory 44. As described above, all combinations of the conditions A to C of each of the recording layers in the signal intensity measuring region 52 are assigned over the areas 53-01 to 53-27, and each area has the corresponding zero-order diffraction efficiencies D1 to D3, received light intensity ratios α1 to α3 (and β1 to β3) of the crosstalk light beams with respect to the signal light beams, and the degree of modulations Mod1 to Mod3.

Although the symbols are given in Table 1, actually measured or calculated numerical values are stored in the memory 44. The suffixes i (i=1 to 3) of the received light intensity ratios $\alpha_i$ and $\beta_i$ and the degree of modulation $Mod_i$ indicate the numerical values when the $L_i$ layer (focusing on the $L_i$ layer) is reproduced. For example, when the area 53-25 of the L1 layer is reproduced, the received light intensity ratio of the crosstalk light beam and the degree of modulation of the resulting signal intensity variation are expected to be $\alpha_{125}$ (and $\beta_{125}$) and $Mod_{125}$, respectively.

The value m obtained by substituting $\alpha_{125}$ and $Mod_{125}$ for α and Mod in the equation (10) is the coherence parameter of the area 53-25 of the L1 layer.

When reproducing the L1 layer to L3 layer, there are 27 cases for each layer as described above, so there are 27×3=81 combinations (of α and Mod) in total. The value m that most adequately represents the performance of a whole system is calculated from these data by the arithmetic mean or least-squares method.

The present exemplary embodiment permits each of the L1 layer to the L3 layer to have three reflection conditions A to C and allows all combinations to appear in the measuring region. The purpose of using as many as 81 combinations is to obtain the value m of a whole system with a necessary accuracy.

To obtain a relationship between the signal light beam and the crosstalk light beam, as described above, the focus position of the laser beam is controlled by the servo driver 22 so as to focus on each of the L1 layer to the L3 layer and then the signal intensity variation is measured.

That is, depending on which recording layer is focused, the multiple crosstalk light beams as well as the signal light beam change their optical paths. When the L3 layer is reproduced, for example, the light that is incident on the multi-layer optical recording medium 12 from the cover layer 12A side and reflected only on the L3 layer is a signal light beam, whereas the other light beams that take various optical paths are referred to together as crosstalk light beams.

Taking multiple reflections into account, countless crosstalk light beams are substantially present. It is known, however, that the light component (confocal crosstalk light beam) that reflects three times in total on the L2 layer, the L1 layer, and the L2 layer in this order is the dominant contributor to the crosstalk intensity.

Accordingly, in the signal intensity variation measurements of the invention, when the received light intensity ratio α of the crosstalk light beam is obtained from the zero-order diffraction light, the equations may be formulated like the equations (2) to (10) only in consideration of the confocal crosstalk light beam. Alternatively, the equations may be formulated in such a way that the upper limit of the number of reflections is set and only the crosstalk light beam that reflects, for example, once or three times is considered.

Figure 9:
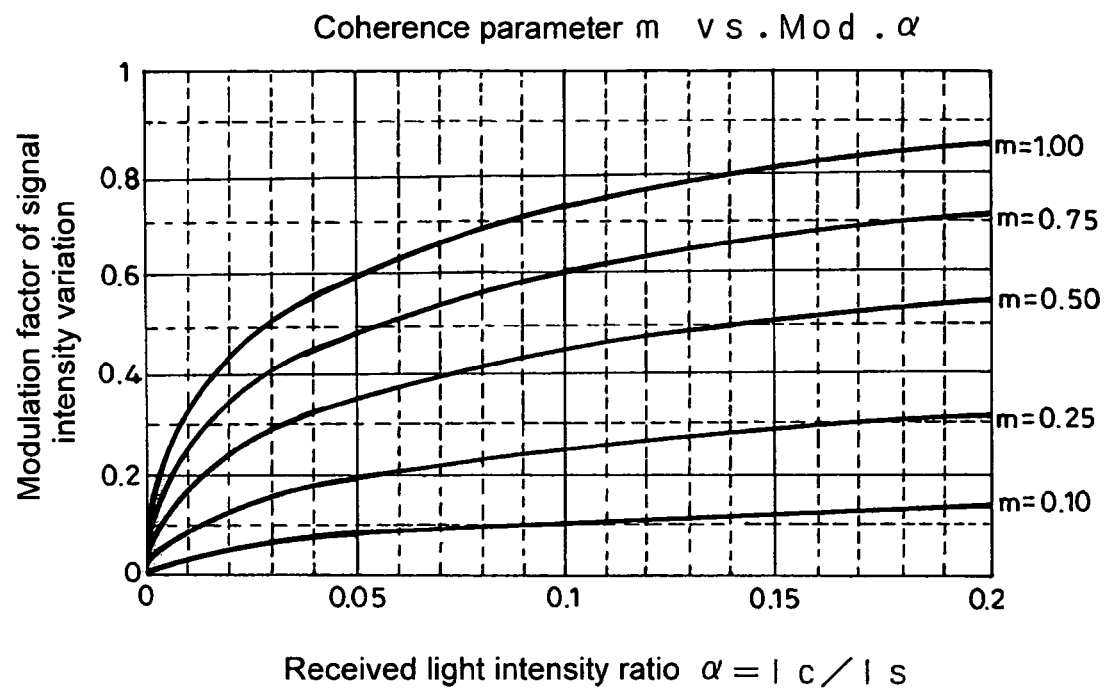
FIG. 9 is a diagram showing a relationship between the coherence parameters m and the degree of modulation of the signal intensity variation.

FIG. 9 shows the relationship between the received light intensity ratio α and the signal intensity variation Mod, i.e., the relationship described in the equation (10), when the coherence parameters m are given. It is appreciated from FIG. 9 that the higher the coherence or the larger the received light intensity ratio α, the more the signal intensity variation increases.

When reproducing a multi-layer optical recording medium, conventional methods optimize the amount of the detected crosstalk light beam itself or optimize the design of an optical system or a recording medium to control the value of the received light intensity ratio α. An increase in the number of recording layers, however, dramatically increases the number of crosstalk light beams caused by multiple reflections, resulting in difficulty in controlling the received light intensity ratio α.

It is appreciated from FIG. 9 that the signal intensity variation can also be controlled by decreasing the coherence of a whole recording system, which is especially effective when the number of recording layers increases so that the received light intensity ratio α becomes large. Accordingly, in the multi-layer optical recording, using the coherence parameter m as an indicator of the performance of the system is very effective evaluation means.

Figure 10:
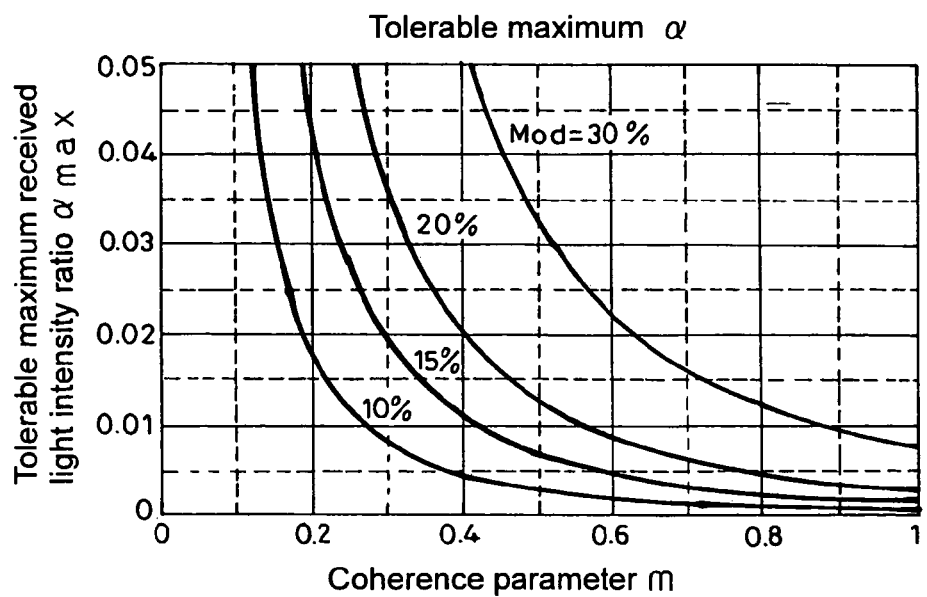
FIG. 10 is a diagram showing a relationship between the coherence parameter m and the received light intensity ratio α when the degree of modulations of the signal intensity variations are given.

The evaluation method of the invention can change the number of crosstalk light beams to be considered according to a practical cost with a required measurement accuracy. As with FIG. 9, FIG. 10 describes the equation (10) by a graph and shows a relationship between the coherence parameter m and the received light intensity ratio α when the degree of modulations Mod of the signal intensity variations are given. According to experiments and calculations, it is practically difficult to reduce the received light intensity ratio α to less than 1%; when tolerable signal intensity variations are 10%, 15%, 20%, and 30%, the upper limits of the coherence parameters m required by a whole system are 0.26, 0.40, 0.56, and 0.90, respectively.

What is claimed is:

1. A multi-layer optical recording medium having at least three recording layers stacked with a transparent spacer layer interposed between each layer and the next layer, the multi-layer optical recording medium comprising:

a signal intensity measuring region formed within a recording region of the multi-layer optical recording medium and divided into a plurality of areas, formed such that a reflectivity of each of the recording layers in an area having an identical address is allowed to have at least three different levels, and a reflectivity measuring region in which positions of inner circumference ends of the recording layers facing an inner hole are sequentially offset so that the recording layer closer to a light incident surface is more remote from the inner hole so as to enable a reproducing beam to illuminate and its reflection, a signal light beam, to exit at least one recording layer among the plurality of recording layers excluding the recording layer on the nearest side to incident light, through the transparent spacer layer and without passing through the other recording layers, wherein, in the signal intensity measuring region, different combinations of the recording layers and the reflectivities are assigned to the areas having different addresses, and the recording layers are areas capable of recording data.

2. The multi-layer optical recording medium according to claim 1 wherein if the number of the recording layers is denoted by N and the number of levels of the reflectivity of each recording layer is denoted by M, the signal intensity measuring region includes $M^N$ areas.

3. The multi-layer optical recording medium according to claim 1 wherein:

the recording layers in the signal intensity measuring region are formed flat; and a reflection condition of each of the recording layers in an identical area in the signal intensity measuring region is changed by at least the depth of a groove on the recording layer among the depth, width, and pitch of the groove.

4. The multi-layer optical recording medium according to claim 2, wherein:

the recording layers in the signal intensity measuring region are formed flat; and a reflection condition of each of the recording layers in an identical area in the signal intensity measuring region is changed by at least the depth of a groove on the recording layer among the depth, width, and pitch of the groove.

5. The multi-layer optical recording medium according to claim 1, wherein in the reflectivity measuring region, positions of outer circumference ends of the recording layers are sequentially offset so that the recording layer closer to the light incident surface is more inside.

* * * * *